(12) United States Patent
Mase et al.

(10) Patent No.: US 8,298,307 B2
(45) Date of Patent: Oct. 30, 2012

(54) PROCESS FOR PRODUCING GEL-LIKE ABRASIVE MATERIAL AND GEL-LIKE ABRASIVE MATERIAL

(75) Inventors: Keiji Mase, Tokyo (JP); Shozo Ishibashi, Tokyo (JP); Hirofumi Nakayama, Tokyo (JP); Changming Zhao, Tokyo (JP); Christian Ruslim, Tokyo (JP)

(73) Assignee: Fuji Manufacturing Co., Ltd., Tokyo (JP)

( * ) Notice: Subject to any disclaimer, the term of this patent is extended or adjusted under 35 U.S.C. 154(b) by 303 days.

(21) Appl. No.: 12/919,608

(22) PCT Filed: Mar. 4, 2009

(86) PCT No.: PCT/JP2009/000979
§ 371 (c)(1),
(2), (4) Date: Aug. 26, 2010

(87) PCT Pub. No.: WO2009/110231
PCT Pub. Date: Sep. 11, 2009

(65) Prior Publication Data
US 2011/0005142 A1    Jan. 13, 2011

(30) Foreign Application Priority Data

Mar. 6, 2008 (JP) ................................. 2008-056918

(51) Int. Cl.
C09K 3/14 (2006.01)
C04B 26/06 (2006.01)
C08K 5/55 (2006.01)
C08K 3/10 (2006.01)
C08K 3/02 (2006.01)
C08K 3/38 (2006.01)
C08K 11/00 (2006.01)
C08F 292/00 (2006.01)
C08L 97/00 (2006.01)
C08L 99/00 (2006.01)

(52) U.S. Cl. ............ 51/302; 51/298; 524/437; 524/701; 524/703

(58) Field of Classification Search .................... 51/298, 51/302; 524/437, 701, 703
See application file for complete search history.

(56) References Cited

U.S. PATENT DOCUMENTS
6,828,378 B2 * 12/2004 Okumura et al. ............... 525/55
(Continued)

FOREIGN PATENT DOCUMENTS
JP            5598565 S         7/1980
(Continued)

*Primary Examiner* — Liam Heincer
(74) *Attorney, Agent, or Firm* — Porzio, Bromberg & Newman, P.C.

(57) ABSTRACT

An abrasive that can impart a mirror finish, glossiness, or the like to a surface of a workpiece by blasting is provided. A crosslinked polyrotaxane compound having a network structure where crosslinking points are circular molecules of polyrotaxane and also having abrasive grains dispersedly mixed therein is obtained by causing chemical bonding between the circular molecules of the polyrotaxane in a state where the abrasive grains and the polyrotaxane are mixed. Then, the crosslinked polyrotaxane compound is granulated to a predetermined grain diameter to obtain a gel-like abrasive where a part of the dispersedly mixed abrasive grain is exposed at the surface. By using the thus-obtained gel-like abrasive in blasting by projecting the abrasive at an angle tilted with respect to a surface of a workpiece, mirror finishing or the like is possible without making the surface of the workpiece pearskin-like.

15 Claims, 3 Drawing Sheets

U.S. PATENT DOCUMENTS

| | | | |
|---|---|---|---|
| 7,151,152 B2* | 12/2006 | Takata et al. | 528/73 |
| 7,847,049 B2* | 12/2010 | Ito et al. | 527/300 |
| 7,968,123 B2* | 6/2011 | Pun et al. | 424/486 |
| 8,067,403 B2* | 11/2011 | Whiteford et al. | 514/183 |
| 2005/0049383 A1* | 3/2005 | Takata et al. | 528/44 |
| 2007/0205395 A1* | 9/2007 | Nakajima et al. | 252/299.01 |
| 2009/0030108 A1* | 1/2009 | Ito et al. | 523/106 |
| 2009/0047532 A1* | 2/2009 | Ito et al. | 428/532 |
| 2009/0088546 A1* | 4/2009 | Ito et al. | 527/300 |
| 2009/0149579 A1* | 6/2009 | Ito et al. | 524/96 |
| 2009/0202461 A1* | 8/2009 | Rodriguez et al. | 424/63 |
| 2009/0214871 A1* | 8/2009 | Fukuda et al. | 428/413 |
| 2009/0297464 A1* | 12/2009 | Jegou | 424/70.2 |
| 2009/0312490 A1* | 12/2009 | Ito et al. | 525/54.2 |
| 2009/0312492 A1* | 12/2009 | Ruslim et al. | 525/55 |
| 2010/0047200 A1* | 2/2010 | Luukas et al. | 424/64 |
| 2010/0129677 A1* | 5/2010 | Ito et al. | 428/532 |
| 2010/0178767 A1* | 7/2010 | Schubert et al. | 438/692 |
| 2010/0184934 A1* | 7/2010 | Ito et al. | 527/300 |
| 2011/0105688 A1* | 5/2011 | Ruslim et al. | 525/54.26 |
| 2011/0319527 A1* | 12/2011 | Suzuki et al. | 524/27 |

FOREIGN PATENT DOCUMENTS

| | | |
|---|---|---|
| JP | 2957492 B2 | 7/1999 |
| JP | 2001207160 A | 7/2001 |
| JP | 3475252 B2 | 9/2003 |
| JP | 2007291187 A | 11/2007 |
| WO | 0183566 A1 | 11/2001 |

* cited by examiner

PROCESS FOR PRODUCING GEL-LIKE ABRASIVE MATERIAL AND GEL-LIKE ABRASIVE MATERIAL

CROSS REFERENCE TO RELATED APPLICATION

This is a National Stage of International Application No. PCT/JP2009/000979, filed Mar. 4, 2009, which claims the benefit of Application No. 2008-05918, filed in Japan on Mar. 6, 2008, the disclosures of which Applications are incorporated by reference herein.

TECHNICAL FIELD

The present invention relates to a method for producing a gel-like abrasive and to a gel-like abrasive and, more specifically, relates to a method for producing a gel-like abrasive that can impart, for example, gloss, luster, a mirror finish, or smoothness to a processing surface of a workpiece by being ejected or projected onto the surface of the workpiece with a blasting machine, as well as to a gel-like abrasive.

Note that, in the present specification, the term "blasting" broadly includes blasting methods such as dry blasting and wet blasting in which an abrasive is ejected using compressed fluid such as compressed air, as well as blasting methods that can project an abrasive onto a processing surface of a workpiece at a predetermined ejection speed and an ejection angle, such as a centrifugal system (impeller system) in which an impeller is rotated to apply a centrifugal force to an abrasive to project it and a flattening system in which a hammering rotor strikes an abrasive to project it.

BACKGROUND ART

As a polishing process for improving the surface roughness of a processing surface of a workpiece and imparting a mirror finish, gloss, and so on to the processed surface, usually, for example, polishing with polishing paper or polishing cloth, polishing with buff, lapping, polishing by contact with rotating abrasive grains, or polishing by contact with abrasive grains subjected to ultrasonic vibration is performed, but blasting is not employed.

The reason that the blasting is thus not used for the polishing process such as mirror finishing and gloss finishing is that, since the blasting is a process in which an abrasive is ejected or projected onto a workpiece to cause the abrasive to collide with the processing surface of the workpiece, pearskin-like irregularities are formed on the surface of the workpiece when the abrasive collides with the workpiece surface.

In order to prevent the formation of such pearskin-like irregularities and, for example, to cut the surface of the workpiece with high precision, it has been suggested to perform blasting using fine abrasive grains having a grit size of about No. 3000 (4 μm).

However, when such fine abrasive grains are directly projected, since the mass of individual abrasive grains is small, the abrasive grains are suspended in the air in an ejection chamber formed in a cabinet of a blasting machine, thereby obstructing the view. Therefore, the processing site cannot be observed, and thus processing cannot be accurately performed.

In addition, in the case where the fine abrasive grains are used, a large amount of abrasive grains adhere to the inner surface of the cabinet and the workpiece if the abrasive grains are charged with static electricity. In order to remove this, ion air blowing and wet cleaning are necessary, and, therefore, the blasting machine is required to be provided with a device configuration for performing these, and also blasting is interrupted during the removal operation, resulting in a decrease in productivity.

Accordingly, there is a demand to develop an abrasive that is not suspended in an ejection chamber and does not cause adhesion due to static electricity to the inner surface of a cabinet and a workpiece and yet that can perform processing equivalent to that when the above-described fine abrasive grains are used.

Thus, ordinarily, a processing surface of a workpiece cannot be processed to a glossy surface such as a mirror finish by blasting, but blasting methods that allow polishing of a processing surface of a workpiece by preventing the formation of a pearskin-like texture on the processing surface of the workpiece have been proposed.

For example, in Japanese Patent No. 2957492, a grinding method in which an abrasive composed of abrasive grains attached to a carrier made of porous plant fiber having elasticity using the fat or sugar contained in the plant fiber as an adhesive is mixed with a grinding liquid; the mixture is ejected obliquely towards a surface of a workpiece so that a large number of grains collide with the surface; and the abrasive is made to slide on the processing surface of the workpiece while plastically deforming the carrier to finish the processing surface of the workpiece with the grinding material has been proposed.

Furthermore, in Japanese Patent KOKAI (LOPI) No. 2001-207160, a polishing method in which an abrasive composed of a core having a desired elasticity and adhesiveness as a result of containing water, such as gelatin, and a plurality of abrasive grains stuck to the surface of the core due to the adhesiveness is used, and the abrasive with the core thereof holding water is ejected towards a workpiece so as to collide with and polish the processing surface of the workpiece has been proposed.

In addition, in Japanese Utility Model KOKAI (LOPI) No. S 55-98565, as an abrasive that enables grinding as described above, a granular abrasive having one or a plurality of abrasive grains and an elastic material that is integrally bonded to the abrasive grains and has a restitution coefficient higher than that of the abrasive grains, such as rubber or an acrylic resin, has been proposed.

Furthermore, in Japanese Patent No. 3475252, though it has not been applied to the abrasive field yet, an adhesive elastic material of a crosslinked polyrotaxane compound has been proposed.

Figure 1:
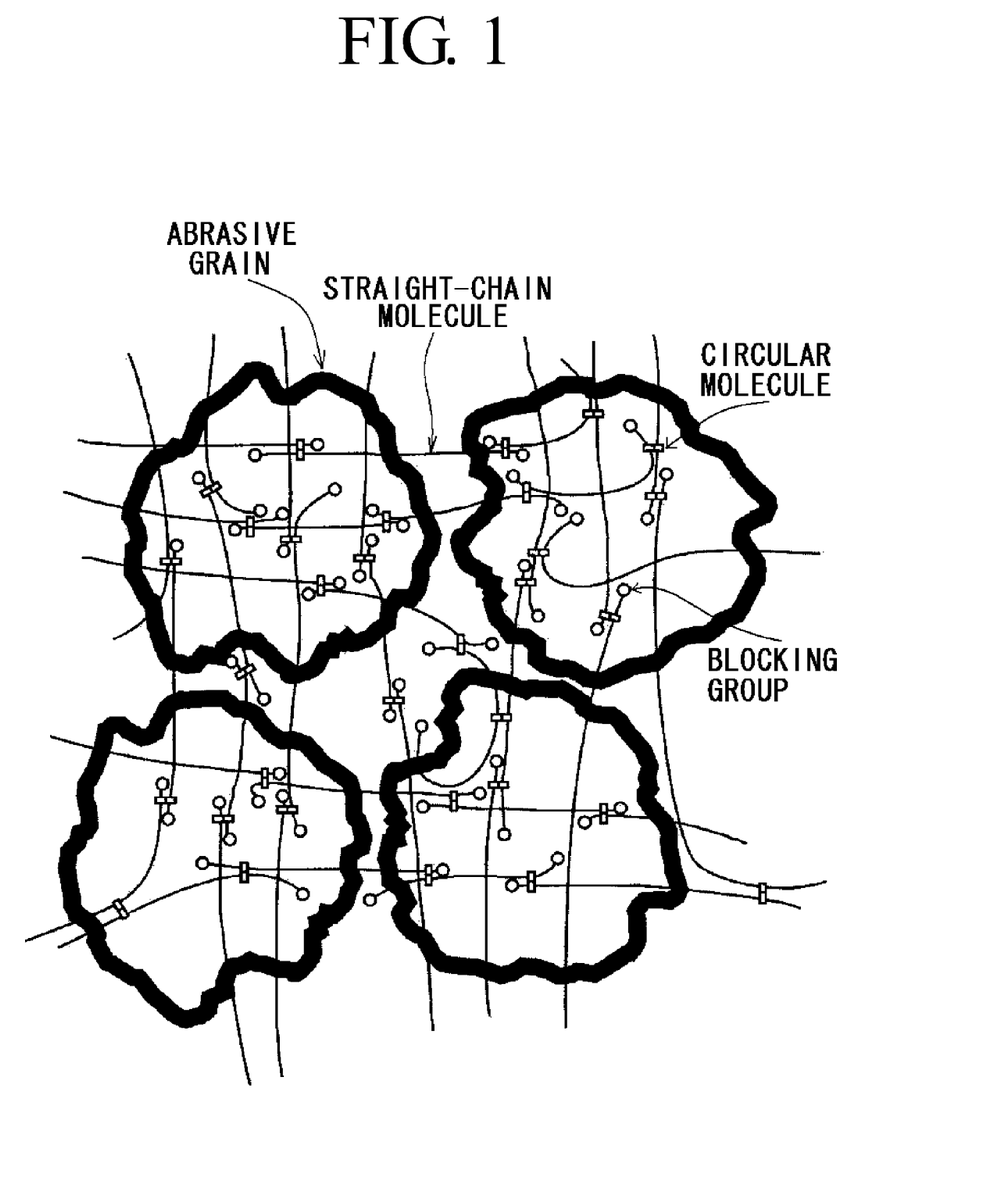
FIG. 1 is a schematic diagram for illustrating the structure of a gel-like abrasive of the present invention.
Figure 2:
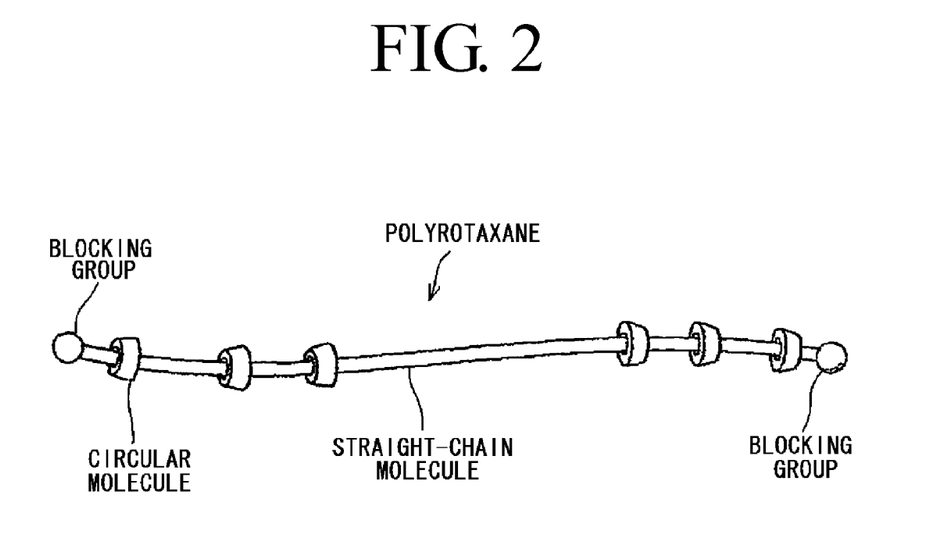
FIG. 2 is a schematic diagram for illustrating the structure of polyrotaxane.
Figure 3:
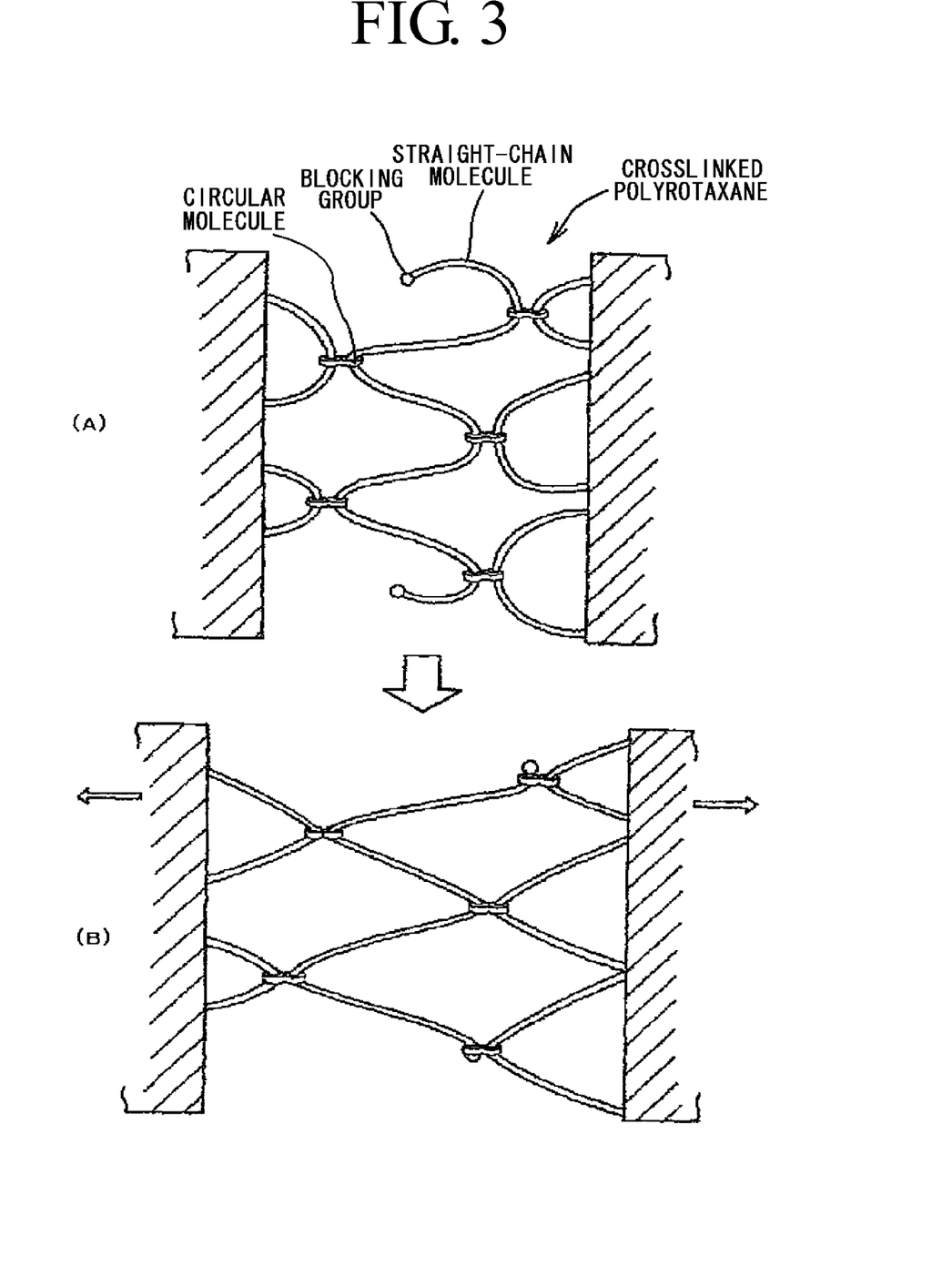
FIG. 3 includes schematic diagrams for illustrating the structure of crosslinked polyrotaxane and shows a normal state (A) and a state where a tensile force is applied in the direction of the arrow (B).

Here, the "polyrotaxane" has a structure in which a straight-chain molecule cannot be drawn out from circular molecules due to blocking groups bonded on both ends of the straight-chain molecule passing through open portions of a plurality of the circular molecules (see FIG. 2), and the "crosslinked polyrotaxane" is one crosslinked by chemical bonding between the circular molecules of a plurality of the polyrotaxane molecules (see FIG. 3). In this crosslinked polyrotaxane, no direct crosslinking point is present between the straight-chain molecules, and thereby the straight-chain molecule can move in the open portions of the circular molecules. Therefore, when a stress is applied to such a compound, the crosslinking point moves by the movement of the straight-chain molecule in the open portions of the circular molecules [see FIGS. 3(A) and (B)]. As a result, the internal stress of the compound is dispersed to thereby give higher breaking strength, elasticity, and resilience, and also the straight-chain molecules form a network structure to thereby give a high swelling property.

DISCLOSURE OF THE INVENTION

Problem to be Solved by the Invention

As described in the related art above, in the abrasive in which abrasive grains are attached to the surface of a carrier or core having elasticity or the abrasive in which abrasive grains and elastic material are integrally bonded to each other (these abrasives are collectively referred to as "elastic abrasive"), since the carrier or core or the elastic material is plastically deformed, impressions are hardly formed on the surface of a workpiece when the abrasive collides with the workpiece. Therefore, blasting can be performed while preventing the surface of the workpiece from becoming pearskin-like.

However, the above-described known elastic abrasives have the following problems:
(1) Problems with the Elastic Abrasive Having Abrasive Grains Supported on Surface (Japanese Patent No. 2957492 and Japanese Patent KOKAI (LOPI) No. 2001-207160)
(1-1) Change in Cutting Ability Due to Detachment of Abrasive Grains and so on Among the above-described elastic abrasives, in those having a structure in which abrasive grains are attached to the surface of a carrier or core, the abrasive grains are attached to the surface of the carrier or core by the fat or sugar contained in the carrier or the adhesiveness of the core. In such elastic abrasives, the abrasive grains adhering to the surface detach due to impact by collision when the abrasive is projected onto a surface of a workpiece.

Accordingly, in the elastic abrasive having the structure above, if the used abrasive is collected and reused repeatedly, the cutting performance of the abrasive is changed by the detachment of the abrasive grains. Consequently, even if the processing is performed under constant conditions, a constant processed state cannot be reproduced in workpieces.

In order to solve these problems, if treatment such as replacement of the whole elastic abrasive at each use is carried out, the amount of the abrasive to be used would be considerable, which causes an increase in cost.
(1-2) Adhesion of Dust Such as Cutting Powder and Burrs Furthermore, in the elastic abrasives in which abrasive grains are supported on the surface of a carrier or a core as described above, the abrasive grains are supported by the adhesiveness of the fat or sugar contained in the carrier or the adhesiveness of the core itself.

However, the adhesiveness of the carrier or the core is not only exhibited with respect to the abrasive grains but is also exhibited as a force attaching or supporting other substances. Consequently, if such an elastic abrasive is used repeatedly, detachment of the abrasive grains attached to or supported on the surface of the carrier or the core is caused as described above, and, at the same time, dust such as cutting powder and burrs adhere to the gaps generated by the detachment of the abrasive grains.

The dust thus-attached to the surface of the carrier or the core also exhibits a cutting performance, as with the abrasive grains, when they come into contact with a surface of a workpiece, but the cutting performance exhibited by the dust such as the cutting powder or burrs is different from the cutting performance exhibited by the abrasive grains, whose material, grain diameter, and so on are determined so that a predetermined cutting performance is exhibited.

As a result, if the elastic abrasive in which dust is attached to the surface of the carrier or the core is collected and reused repeatedly, the surface of a workpiece processed with such an elastic abrasive cannot be processed into a state that is originally intended. For example, though the blasting is performed for mirror finishing, mirror finishing is not obtained and fogging or dullness may occur or scuffs may be generated.

In order to solve such problems, it has been suggested to remove the dust such as cutting powder and burrs adhering to the surface by, for example, washing the used abrasive with water, but washing removes not only the dust such as cutting powder and burrs but also the abrasive grains.

In addition, in the abrasive in which abrasive grains are attached to the surface by the fat or sugar contained in plant fiber, if the fat or sugar is washed out by washing with water. Therefore, the abrasive grains cannot adhere to the surface, and the abrasive cannot be reused.
(1-3) Decrease in Collection Rate and Detachment of Abrasive Grains Due to Drying Furthermore, as described above, in the elastic abrasives in which plant fiber or gelatin is used as the carrier or the core, moisture is lost by heat due to collision if the processing is performed by projecting only the elastic abrasive onto the surface of a workpiece without using a polishing liquid.

Then, if the moisture in the carrier or the core is lost, the carrier or the core is hardened and, thereby, is crushed by impact due to collision with the surface of the workpiece or cannot slide on the surface of the workpiece, being unable to absorb the impact at the time of collision, and furthermore, for example, a pearskin-like texture is generated on the surface of the workpiece, with the result that a desired processed state cannot be obtained.

On the other hand, when the elastic abrasive is projected together with a polishing liquid in order to prevent such drying of the elastic abrasive, the surface of the workpiece is contaminated with the polishing liquid, which requires additional steps of washing and drying the workpiece after the blasting.
(2) Problems with the Abrasive Having Abrasive Grains Bonded to Rubber or the like (Japanese Utility Model KOKAI (LOPI) No. S55-98565)
(2-1) Occurrence of Pearskin Surface Compared to the abrasive having a structure in which abrasive grains are attached to the surface of a carrier or a core described above, in the abrasive in which abrasive grains are integrally bonded to an elastic material such as rubber or an acrylic resin by, for example, dispersion, dust such as cutting powder and burrs hardly adheres to the surface, unlike the adhesive in which abrasive grains are attached to the surface of a carrier or core by adhesion.

Furthermore, even if dust such as cutting powder and burrs is attached, it can be removed by washing the abrasive, and thereby the abrasive can be stably reused.

However, in the abrasive in which the elastic material and abrasive grains are bonded as described above, even if only the abrasive is ejected towards a surface of a workpiece, the abrasive cannot smoothly slide on the surface of the workpiece, and therefore the problem of a pearskin surface being formed still remains (for example, column [0003] of Japanese Patent KOKAI (LOPI) No. 2001-207160).
(2-2) Occurrence of Static Electricity In addition, in resin-based abrasive in which abrasive grains agglomerate by means of an acrylic resin, static electricity is generated at the collision with a workpiece, and thereby the abrasive adheres to the surface of the workpiece, the inner wall of a processing chamber, and so on, which causes a problem in that collection of the abrasive is difficult.

If the elastic abrasive is projected together with a polishing liquid for preventing such an occurrence of static electricity, post-processing steps such as washing and drying of the workpiece contaminated with the polishing liquid are necessary, as described above.

(2-3) Durability

Furthermore, in the above-described elastic abrasive in which abrasive grains are bonded to rubber or an acrylic resin, the durability is higher than that of the carrier or core made of plant fiber or gelatin. However, for example, a rupture originating at the boundary portion with the embedded abrasive grains is induced. Thus, the durability is still insufficient, and the amount of abrasive that can be reused is reduced.

(2-4) Recyclability

Furthermore, as described above, in the elastic abrasive in which abrasive grains are dispersedly mixed in an elastic material such as rubber or an acrylic resin, it is difficult to separately collect the abrasive grains and the rubber or the acrylic resin. Therefore, the used elastic abrasive is disposed of without being reused or is applied to very restrictive use even if reused.

Furthermore, upon disposing of it, the elastic materials such as rubber and acrylic resins are not biodegradable unlike the above-described plant fiber carrier and the gelatin core, and harmful gas may be generated if they are incinerated. Thus, the environmental burden is high.

Therefore, those that can be recycled by dividing the constituent materials into each component and collecting them after they complete their role as an abrasive and are disposed of, or those that are biodegradable even if they are disposed, meet current social conditions where there is acute recognition of the environmental burden and so on.

(3) Purposes of the Present Invention

Accordingly, the present invention has been made for eliminating the shortcomings of the above-mentioned related arts, and it is an object of the present invention to provide an abrasive that can eliminate the problems with the elastic abrasive in which abrasive grains are attached to the surface of the above-mentioned carrier or core by employing an elastic abrasive structure having a structure in which abrasive grains are dispersedly mixed in an elastic material and also can eliminate the various problems with the known elastic abrasive having a structure in which abrasive grains are dispersedly mixed.

SUMMARY OF THE INVENTION

Means for Solving the Problems

A method for producing a gel-like abrasive of the present invention for achieving the above-mentioned object includes obtaining a crosslinked polyrotaxane compound having a network structure where crosslinking points are circular molecules of polyrotaxane and also having abrasive grains dispersedly mixed therein by causing chemical bonding between the circular molecules of the polyrotaxane in a state where the abrasive grains and the polyrotaxane are mixed, and then granulating the crosslinked polyrotaxane compound to a predetermined grain diameter.

In the method for producing the gel-like abrasive having the above-mentioned structure, the state where the abrasive grains and the polyrotaxane are mixed can be generated by dispersing the abrasive grains in a polyrotaxane solution.

Note that the dispersing of the abrasive grains may be performed by adding abrasive grains to a polyrotaxane solution that is prepared in advance or may be performed by, for example, preparing a suspension of abrasive grains and a solvent and adding polyrotaxane to the suspension: it may be performed by any method as long as a polyrotaxane solution in which abrasive grains are dispersed is eventually obtained.

As the polyrotaxane, various polyrotaxanes can be used, but a polyrotaxane where the circular molecule is α-cyclodextrin and the straight-chain molecule is polyethylene glycol is preferably used, and the solvent of the polyrotaxane solution is preferably, for example, an aqueous NaOH solution.

Furthermore, the chemical bond between the circular molecules can be a covalent bond.

Furthermore, the circular molecules can be chemically bonded by addition of a crosslinking agent.

As such a crosslinking agent when the circular molecule is a-cyclodextrin, 1,4-butanediol diglycidyl ether can be used, as an example.

Furthermore, the gel-like abrasive of the present invention includes a crosslinked polyrotaxane formed by chemical bonding between the circular molecules of polyrotaxane and having a network structure where crosslinking points are the circular molecules; and abrasive grains dispersedly mixed in the crosslinked polyrotaxane so that parts of the abrasive grains are exposed at the surface.

In the gel-like abrasive having the above-mentioned structure, the ratio of the abrasive grains to the crosslinked polyrotaxane is preferably 0.05 to 10.0.

Furthermore, in the gel-like abrasive, the polyrotaxane can have a-cyclodextrin as the circular molecule and polyethylene glycol as the straight-chain molecule.

Effect of the Invention

With the structure of the present invention described above, according to the gel-like abrasive of the present invention, the following significant effects have been obtained.

(1) The gel-like abrasive of the present invention is obtained by crosslinking polyrotaxane by chemical bonding between the circular molecules of the polyrotaxane in the state where abrasive grains are mixed and by granulating the crosslinked polyrotaxane compound in which the abrasive grains are dispersedly mixed to a predetermined grain diameter so that the abrasive grains are exposed at the surface. The thus-obtained abrasive had a high elastic deformation property and was capable of performing blasting without forming a pearskin surface on a workpiece.

(2) In addition, since the gel-like abrasive having the above-mentioned structure has a high durability, for example, crushing or rupturing hardly occurs when the abrasive collides with the surface or the like of a workpiece, and also since the abrasive has a structure in which the abrasive grains are dispersedly mixed in the gel-like material, hardly any abrasive grains are detached by the collision with the surface or the like of a workpiece or washing or the like after use, unlike the elastic abrasive having a structure in which abrasive grains are attached to the surface of a carrier or a core. Therefore, the gel-like abrasive was capable of processing a workpiece at constant processing conditions even when it was reused.

(3) Furthermore, the gel-like abrasive of the present invention has a high swelling property. Therefore, for example, by impregnating the abrasive with a liquid such as water or ethanol, satisfactory slidability on the surface of a subject to be treated was obtained, and it was also possible to suitably prevent the occurrence of static electricity.

(4) A uniform mixture of the abrasive grains and the polyrotaxane can be obtained by achieving a state where the abrasive grains and the polyrotaxane are mixed by dispersing the abrasive grains in a polyrotaxane solution. Therefore, it was possible to maintain constant quality for the thus-obtained gel-like abrasive (dispersion condition of the abrasive grains).

(5) When the polyrotaxane includes α-cyclodextrin as the circular molecule and polyethylene glycol as the straight-chain molecule, since both α-cyclodextrin and polyethylene glycol are biodegradable, it was possible to provide a gel-like abrasive that can reduce the burden on the environment, for example, when it is disposed of.

DETAILED DESCRIPTION OF THE PREFERRED EMBODIMENTS

Next, embodiments of the present invention will be described below with reference to the accompanying drawings.

1. Overall Structure of Abrasive

The gel-like abrasive of the present invention is produced so as to have a predetermined grain diameter and have a structure in which parts of the dispersedly mixed abrasive grains are exposed at the surface by crosslinking polyrotaxane by chemical bonding between the circular molecules of the polyrotaxane in the state where the abrasive grains are mixed to obtain a gel-like crosslinked polyrotaxane compound in which abrasive grains are dispersedly mixed and by granulating the compound.

Here, the above-mentioned term "granulating" includes not only the case where a mass of the obtained crosslinked polyrotaxane compound is formed into irregular shapes but also the case in which the mass is chopped or cut into a predetermined shape. The individual shapes of the gel-like abrasive may have regularity as in a rectangular parallelepiped, a cube, or a flattened shape or may be irregular shapes obtained by crushing the compound with a crusher or the like. Furthermore, these shapes may be mixed. In addition, granulation means, for example, dripping a poor solvent, ejecting, extrusion, molding, or punching, can be used as another method.

The individual sizes of the abrasive can be arbitrarily changed according to various conditions such as the size of a workpiece, the shape of a portion to be processed, and blasting conditions. In this embodiment, as an example, abrasive grains having a maximum diameter of about 0.05 mm to 5 mm are formed.

The ratio of the crosslinked polyrotaxane and the abrasive grains in the obtained abrasive is in the range of about 0.05 to 10.0 as a solid weight ratio of the abrasive grains to the crosslinked polyrotaxane, and more preferably in the range of about 0.10 to 1.0.

The gel-like abrasive may be impregnated with a liquid, thus swelling. By doing so, slidability on a surface of the workpiece can be obtained, and the occurrence of static electricity at collision can be prevented.

As the liquid used for swelling, water can be used, but since the liquid for impregnating the abrasive may adhere to a surface of a workpiece when the abrasive collides with the workpiece, it may be ethanol or the like, which is highly volatile and dries within a relatively short time.

Impregnation with such a liquid is performed at an amount in the range of a factor of about 0.1 to 2 when the weight of the abrasive in the dried state is assumed to be 1. When the impregnation amount is less than this range, satisfactory slidability is not obtained, and the occurrence of static electricity cannot be completely prevented. When the impregnation amount is larger than this range, the liquid adheres to the surface of the workpiece when the abrasive collides with the workpiece, thus contaminating the surface of the workpiece.

2. Raw Material (1) Abrasive Grains

As the abrasive grains used in the gel-like abrasive, any material may be used as long as it can come into contact with a workpiece and process the workpiece into a desired state, and various sizes, materials, and shapes can be selected according to the material of the workpiece to be processed and the desired surface shape (such as a mirror finish, smooth plane, or hair-line processing) after processing.

As the material of the abrasive grains, various materials that are usually used as abrasive grains can be used; for example, alumina-based abrasive grains such as white alundum (WA) and alundum (A), silicon carbide (SiC)-based abrasive grains such as green carborundum, diamond, c-BN, borides, carbon boride, titanium boride, and cemented carbide can be used. As examples, those shown in the following Table 1 can be used, and a mixture of two or more of them may be used as the abrasive grains.

TABLE 1

| | Examples of abrasive grains used in the abrasive of the present invention |
|---|---|
| Plant base | corn core, seed husks of walnut, apricot, nut, peach, etc., pulp, cork |
| Metal base | iron, steel, cast iron, cobalt, nickel, gallium, zirconium, niobium, molybdenum, rhodium, palladium, silver, indium, tin, antimony, zinc, stainless steel, titanium, vanadium, chromium, aluminum, silicon, copper, $MnO_2$, $Cr_2O_3$, alloys thereof |
| Ceramic base | glass, quartz, alundum, white alundum, carborundum, green carborundum, zircon, zirconia, garnet, emery, carbon boride, titanium boride, aluminum-magnesium boride, boron nitride |
| Inorganic base | carbonates, sulfates, and fluorides of calcium, sulfates and chlorides of barium, sulfates and hydroxides of aluminum, carbonates, sulfates, and chlorides of strontium, oxides of titanium, basic magnesium carbonate, magnesium hydroxide, carbon, graphite, graphite fluoride, molybdenum disulfide, tungsten disulfide |

The grain size of the abrasive grains is not limited and can be arbitrarily selected according to the purpose of processing: for example, abrasive grains in the range of 0.1 μm to 1 mm can be used.

When mirror finishing or the like to provide a processing surface of a workpiece with gloss is performed, it is preferable to use fine abrasive grains of 6 μm or less (#2000 or more). In the abrasive of the present invention, fine abrasive grains having an average grain diameter of 1 μm or less (#8000 or more) can also be used.

Furthermore, when a processing surface of a workpiece is cut into a desired shape, rough abrasive grains of 30 μm or more (#400 or less) may be used, and abrasive grains of 1 mm also can be used in the present invention.

(2) Polyrotaxane
(2-1) Structure of Polyrotaxane

The polyrotaxane has a structure in which blocking groups are bonded on both ends of a straight-chain molecule passing through open portions of a plurality of circular molecules so that the straight-chain molecule cannot be drawn out from the circular molecules (see FIG. 2), as described above, and "polyrotaxane" in which the straight-chain molecule cannot be drawn out from the circular molecules can be obtained by inserting the straight-chain molecule into the open portions of the circular molecules to obtain "pseudo-polyrotaxane" (the state where blocking groups are not arranged) and by bonding blocking groups to both ends of the straight-chain molecule of the pseudo-polyrotaxane.

(2-2) Straight-Chain Molecule

The above-mentioned straight-chain molecule constituting the polyrotaxane is not particularly limited as long as it is a molecule or material that can be noncovalently combined with the circular molecules by being inserted in the open portions of the circular molecules described below and is a straight chain. Furthermore, in the present invention, the term "straight-chain molecule" means molecules including polymers, and all materials satisfying the above-mentioned requirements are included.

Furthermore, in the present invention, the "straight chain" of the "straight-chain molecule" means to be substantially "straight chain". That is, the straight-chain molecule may have a branched chain as long as circular molecules can rotate or can slide or move on the straight-chain molecule. In addition, the length of the "straight chain" is not particularly limited as long as circular molecules can slide or move on the straight-chain molecule.

Examples of the straight-chain molecule of the present invention include hydrophilic polymers, for example, polyvinyl alcohol, polyvinylpyrrolidone, poly(meth)acrylic acid, cellulose-based resins (such as carboxymethyl cellulose, hydroxyethyl cellulose, and hydroxypropyl cellulose), polyacrylamide, polyethylene oxide, polyethylene glycol, polyvinyl acetal-based resins, polyvinylmethyl ether, polyamine, polyethylene-imine, caseine, gelatin, starch or the like and/or copolymers thereof; hydrophobic polymers, for example, polyolefin-based resins such as polyethylene, polypropylene, and copolymer resins with other olefin-based monomers, polyester resins, polyvinyl chloride resins, polystyrene-based resins such as polystyrene and acrylonitrile-styrene copolymer resins, acryl-based resins such as polymethylacrylate, (meth)acrylic acid ester copolymers, and acrylonitrile-methyl acrylate copolymer resins, polycarbonate resins, polyurethane resins, vinyl chloride-vinyl acetate copolymer resins, and polyvinyl butyral resins; and their derivatives or modifications.

Among them, polyethylene glycol, polyisoprene, polyisobutylene, polybutadiene, polypropylene glycol, polytetrahydrofuran, polydimethylsiloxane, polyethylene, and polypropylene are preferred. In particular, polyethylene glycol is preferred.

It is preferred that the straight-chain molecule of the present invention itself have high breaking strength. The breaking strength of the compound or the gel also depends on other factors, such as the bonding strength between the blocking group and the straight-chain molecule and the bonding strength between circular molecules, but if the straight-chain molecule of the present invention itself has high breaking strength, higher breaking strength can be provided.

It is preferred that the straight-chain molecule of the present invention have a molecular weight of 1,000 or more, for example, 1,000 to 1,000,000; preferably 5,000 or more, for example, 5,000 to 1,000,000 or 5,000 to 500,000; more preferably 10,000 or more, for example, 10,000 to 1,000,000, 10,000 to 500,000, or 10,000 to 300,000.

Furthermore, if the straight-chain molecule of the present invention is biodegradable, it is preferred in that the burden on the environment when disposing of it etc. can be reduced.

The straight-chain molecule of the present invention preferably has reactive groups on both ends. By having the reactive groups, the straight-chain molecule can easily react with blocking groups. The reactive groups depend on the blocking groups used, but examples thereof include a hydroxyl group, an amino group, a carboxyl group, and a thiol group.

(2-3) Circular Molecule

The circular molecule of the polyrotaxane may be any circular molecule as long as the straight-chain molecule can be inserted into its open portion, and as long as it can rotate or slide on the straight-chain molecule.

In addition, in the present invention, the term "circular molecule" means various circular materials including circular molecules. In addition, in the present invention, the term "circular molecule" means a substantially circular molecule or material. That is, the term "substantially circular" includes those being not completely closed, such as a letter "C" and also include those having a spiral structure in which both ends of a letter "C" overlap each other without bonding.

Examples of the circular molecule of the present invention include various cyclodextrins (for example, α-cyclodextrin, β-cyclodextrin, γ-cyclodextrin, dimethylcyclodextrin, glycosylcyclodextrin, and their derivatives or modifications), crown ethers, benzocrowns, dibenzocrowns, dicyclohexanocrowns, and their derivatives or modifications.

The sizes of the open portions of the above-mentioned cyclodextrins, the crown ethers, etc. are different depending on their types. Therefore, the circular molecule used can be selected according to the type of the straight-chain molecule to be used, specifically, for example, when the straight-chain molecule used is assumed to be cylindrical, according to the diameter of a cross section of the cylinder and whether the straight-chain molecule is hydrophobic or hydrophilic. In addition, when a circular molecule having a relatively large open portion and a cylindrical straight-chain molecule having a relatively small diameter are used, two or more straight-chain molecules may be clathrated in the open portion of the circular molecule.

Among them, since cyclodextrins are biodegradable, the use thereof is preferred in that the environmental burden when disposing of them etc. is reduced, as described above.

It is preferable to use α-cyclodextrin as the circular molecule and polyethylene glycol as the straight-chain molecule.

The circular molecule of the present invention preferably has a reactive group on the outside of its circle. As described below, when the circular molecules are bonded or crosslinked to each other, the reaction can be easily performed using the reactive group. The reactive group depends on, for example, the crosslinking agent used, but examples thereof include a hydroxyl group, an amino group, a carboxyl group, a thiol group, and an aldehyde group. Furthermore, it is preferable to use a group that does not react with the blocking group during a blocking reaction described below.

(2-4) Blocking Group

The blocking groups are those that are bonded on both ends of the straight-chain molecule so that the straight-chain molecule passing through the open portion of the circular molecule cannot be drawn out from the open portion of the circular molecule, as described above, and any groups may be used so long as the straight-chain molecule is not allowed to be drawn out from the open portion of the circular molecule.

Such groups may be, for example, those that make both ends of the straight-chain molecule bulky relative to the open portion of the circular molecule that prevent the straight-chain molecule from being drawn out or ionic groups that result in the straight-chain molecule not being drawn out, for example, by reacting (for example, repelling) with the ionic property of the circular molecule. Here, the term "group" means various groups including molecular groups and polymer groups. That is, the group having "bulkiness" may be a molecular group schematically shown to be spherical in FIG. 2 or may be a polymer solid or a main chain or a side chain of a polymer.

When the blocking group is a polymer, the polymer serves as a matrix, and the compound of the present invention may be partially contained therein, or, conversely, the compound of the present invention serves as a matrix and the polymer may be partially contained therein. Thus, by combining it with a polymer having various characteristics, a complex material in which the characteristics of the compound of the present invention and the characteristics of the polymer are combined can be formed.

Specifically, examples of the blocking group of a molecular group include dinitrophenyl groups such as the 2,4-dinitrophenyl group and the 3,5-dinitrophenyl group, cyclodextrins, adamantane groups, trityl groups, fluoresceins, pyrenes, and their derivatives or modifications.

More specifically, examples in the case of using α-cyclodextrin as the circular molecule and polyethylene glycol as the straight-chain molecule also include cyclodextrins, dinitrophenyl groups such as the 2,4-dinitrophenyl group and the 3,5-dinitrophenyl group, adamantane groups, trityl groups, fluoresceins, pyrenes, and their derivatives or modifications.

(2-5) Example of Production of Polyrotaxane

Such polyrotaxane can be prepared as follows, as an example.

First, circular molecules and straight-chain molecules are mixed to prepare the above-described pseudo-polyrotaxane where the straight-chain molecule is inserted in the open portion of the circular molecule.

In this preparation step, various solvents may be used in the mixing. The solvent is, for example, a solvent that dissolves the circular molecule and/or the straight-chain molecule or suspends the circular molecule and/or the straight-chain molecule. Specifically, the solvent can be suitably selected depending on the circular molecule and/or the straight-chain molecule used in the present invention.

The amount of the circular molecule through which the straight-chain molecule passes is preferably controlled when the polyrotaxane is prepared. It is desirable that one length of the straight-chain molecule pass through at least two (2) circular molecules. When the maximum amount of the circular molecules that can be present on one straight-chain molecule, namely, the maximum clathrate amount, is assumed to be 1, the circular molecule may be present in an amount of 0.001 to 0.6, preferably 0.01 to 0.5, and more preferably 0.05 to 0.4 relative to the maximum clathrate amount.

The amount of the circular molecule can be controlled by adjusting the mixing time, temperature, and pressure and by increasing the molecular weight of the straight-chain molecule to be used. More specifically, an excess amount of the straight-chain molecule may be dissolved in a saturated solution of the circular molecule.

The polyrotaxane used for producing the blasting abrasive of the present invention is preferably one where the circular molecules are not densely packed on the straight-chain molecule, as described above. By not being densely packed, the movable distance of the crosslinked circular molecules or the straight-chain molecule can be maintained when they have been crosslinked. With this movable distance, high breaking strength, high entropic elasticity, excellent expansibility, and/or excellent resilience, and high restoration property or moisture-absorbing ability can be provided.

In order that the straight-chain molecule cannot be drawn out from the circular molecules of the thus obtained pseudo-polyrotaxane, both ends of the straight-chain molecule are blocked with the above-described blocking groups to prepare a blocked polyrotaxane.

3. Production of Gel-Like Abrasive (1) Outline

In the state where both the abrasive grains and polyrotaxane are mixed as the raw materials described above, the circular molecules of the polyrotaxane are chemically bonded to each other for crosslinking to obtain a gel-like crosslinked polyrotaxane compound in which the abrasive grains are dispersedly mixed.

By granulating the thus-obtained crosslinked polyrotaxane compound to a predetermined grain diameter, the gel-like abrasive of the present invention in which the abrasive grains are dispersedly mixed and a part of the abrasive grain is exposed at the surface can be obtained.

(2) Production of Crosslinked Polyrotaxane Compound in which Abrasive Grains are Dispersedly Mixed (2-1) Generation of Abrasive Grains/Polyrotaxane Mixed State The above-described mixed state of the abrasive grains and the polyrotaxane can be generated, for example, by suspending the abrasive grains, by mixing and stirring, in a polyrotaxane solution obtained by dissolving the polyrotaxane in a solvent; or by suspending the abrasive grains in a polyrotaxane solution in which polyrotaxane is dissolved, for example, by mixing, stirring, and so on the polyrotaxane, a solvent, etc. in a suspension of the abrasive grains obtained by stirring and so on the abrasive grains in a liquid such as water.

(2-2) Crosslinking

The crosslinked polyrotaxane compound in which the abrasive grains are dispersedly mixed can be obtained by crosslinking the polyrotaxane in the state where the abrasive grains and the polyrotaxane are mixed.

Incidentally, as the polyrotaxane mixed with the abrasive grains, one type of the polyrotaxanes may be used or a mixture of a plurality of types of polyrotaxanes may be used. When a plurality of types of polyrotaxanes are mixed, it is preferable that the circular molecules of each polyrotaxane have reactive groups that can react with each other to form a bond so that crosslinking occurs between the different types of polyrotaxanes.

The crosslinking between the polyrotaxanes is achieved by chemical bonding between the circular molecules of the polyrotaxanes. This bond may be formed by direct bonding between the circular molecules or may be formed by bonding between the circular molecules through various molecules or atoms. The conditions for the crosslinking reaction must be conditions that do not remove the blocking groups of the polyrotaxane.

The crosslinking agent used for bonding the circular molecules may be a known crosslinking agent, and examples thereof include 1,4-butanediol diglycidyl ether, cyanuric chloride, trimesoyl chloride, terephthaloyl chloride, epichlorohydrin, dibromobenzene, glutaraldehyde, phenylene diisocyanate, tolylene diisocyanate (for example, 2,4-tolylene diisocyanate), 1,1'-carbonyldiimidazole, and divinyl sulfone. In addition, the examples include various types of coupling agents such as silane coupling agents (for example, various alkoxysilanes) and titanium coupling agents (for example, various alkoxytitaniums).

Furthermore, the examples of the crosslinking agent include various types of optical crosslinking agents that are used in materials for soft contact lenses, for example, stilbazolium salt-based optical crosslinking agents such as formyl styryl pyridinium [see K. Ichimura, et al., Journal of Polymer Science, Polymer Chemistry Edition 20, 1411-1432 (1982) (which is incorporated in the present specification by reference)], and other optical crosslinking agents, for example, optical crosslinking agents by optical doubling, specifically, cinnamic acid, anthracene, and thymines.

The crosslinking agent has a molecular weight of less than 2000, preferably less than 1000, more preferably less than 600, and most preferably less than 400.

When α-cyclodextrin is used as the circular molecule, examples of the crosslinking agent include cyanuric chloride, 2,4-tolylene diisocyanate, 1,1'-carbonyldiimidazole, trimesoyl chloride, terephthaloyl chloride, and alkoxysilanes such as tetramethoxysilane and tetraethoxysilane.

The gel-like crosslinked polyrotaxane compound in which the abrasive grains are dispersedly mixed is obtained, for example, by putting the abrasive grains in a polyrotaxane solution and stirring it and then adding thereto the above-described crosslinking agent and stirring it, or by adding the crosslinking agent to a polyrotaxane solution and then adding the abrasive grains to the polyrotaxane solution before gelation and stirring it.

(3) Granulation

The thus-obtained crosslinked polyrotaxane compound is granulated so as to have a maximum diameter of about 0.05 mm to 5 mm. Thus, the gel-like abrasive of the present invention is produced.

In addition, the abrasive obtained by granulation may be classified by predetermined sizes as needed.

EXAMPLES

Examples of the present invention will be described below

1. Preparation of Polyrotaxane

The polyrotaxane used in this Example for producing an abrasive for blasting had polyethylene glycol (hereinafter, abbreviated as "PEG") as the straight-chain molecule and α-cyclodextrin (hereinafter, abbreviated as "α-CD") as the circular molecule and was obtained by the following method.

(1) Preparation of Straight-Chain Molecule (PEG)

10 g of PEG (molecular weight: 100000), 50 mg of 2,2,6,6-tetramethyl-1-piperidinyloxy radical (TEMPO), and 0.25 g of sodium bromide were dissolved in 110 mL of water.

To the obtained solution, 2.5 mL of a commercially available aqueous sodium hypochlorite solution (effective chlorine concentration: about 5%) was added, and the resulting mixture was allowed to react at room temperature while stirring.

Although the pH of the system sharply drops immediately following the addition as the reaction progresses, the preparation was performed by adding 1 N NaOH so as to maintain the pH at 10 to 11 as much as possible. The reduction in pH disappeared within about 3 minutes; however, the reaction was terminated by adding an excess amount of ethanol, following another 10 minutes of stirring.

Extraction with 50 mL of methylene chloride was repeated three (3) times to extract components other than inorganic salts, and then the ethylene chloride was distilled away with an evaporator.

This was dissolved in 250 mL of warm ethanol, and the solution was left in a freezer at −4° C. overnight to precipitate PEG-carboxylic acid, namely, PEG substituted by carboxylic acid (—COOH) on both ends. The precipitated PEG-carboxylic acid was collected by centrifugation.

The cycle of warm ethanol dissolution-precipitation-centrifugation was repeated several times, and, at the end, drying in a vacuum was performed to obtain PEG-carboxylic acid. The yield was 95% or more, and the carboxylation rate was 95% or more.

(2) Preparation of Pseudo-Polyrotaxane 6 g of the PEG-carboxylic acid obtained with the above method and 24 g of α-CD were respectively dissolved in separately prepared 100 mL of hot water at 70° C. Both solutions were mixed, and then the mixture was left to stand in a refrigerator (4° C.) for 3 days. The precipitated cream-like pseudo-polyrotaxane was lyophilized to collect the pseudo-polyrotaxane.

(3) Blocking by Blocking Group

Adamantaneamine (0.26 g), 0.60 g of a BOP reagent (benzotriazol-1-yl-oxy-tris(dimethylamino)phosphonium hexafluorophosphate), and 0.28 mL of diisopropylethylamine were dissolved in 120 mL of dehydrated dimethylformamide (hereinafter, abbreviated as "DMF"). This solution was added to the pseudo-polyrotaxane obtained in the above. The mixture was shaken well and then left to stand in a refrigerator overnight.

Then, 120 mL of methanol was added thereto, followed by stirring, centrifugation, and removal of the supernatant.

Then, 200 mL of a mixed solution of DMF/methanol=1:1 was added thereto, and the same operation was repeated twice.

Furthermore, the same operation was repeated twice using 200 mL of methanol, and the resulting precipitate was vacuum dried and then was dissolved in 140 mL of dimethyl sulfoxide (hereinafter, abbreviated as "DMSO").

This solution was dropped in 1400 mL of purified water to precipitate the polyrotaxane. The precipitated polyrotaxane was collected by centrifugation and was vacuum dried.

Furthermore, re-precipitation was similarly conducted to obtain 16 g of the polyrotaxane. The resulting polyrotaxane was measured by NMR, confirming that the ratio (molar ratio) of the CD to the PEG monomer was CD:PEG monomer=13.5:100 (clathrate rate: 27%).

2. Examples of Production of Gel-Like Abrasive

Example 1

A polyrotaxane solution was obtained by dissolving 250 g (8.0 wt %) of the polyrotaxane obtained in the above in 1000 mL (32.2 wt %) of an aqueous solution of 1.5 N NaOH. To this solution, 56 mL (1.8 wt %) of 1,4-butanediol diglycidyl ether (hereinafter, abbreviated as "BDGE", a product of Tokyo Chemical Industry Co., Ltd.) was added as a crosslinking agent, followed by mixing of 1800 g (58.0 wt %) of an abrasive (grain size: #8000) including SiC as a main component. The mixture was stirred at room temperature for 28 minutes. After the stirring, the mixture was placed in a stainless steel tray and was left to stand at room temperature for 28 hours for gelation and then was placed in water for neutralization. This gel was crushed into irregular shapes of about 3 mm or less with a mixer (an apparatus having a rotary blade that rotates in a container to crush or cut a substance put in the container by rotation of the rotary blade; the same shall apply hereinafter), followed by washing with water to obtain a gel-like abrasive.

Example 2

200 mL of water was added to 450 g (57.8 wt %) of an abrasive (grain size: #8000) including SiC as a main component, and the mixture was stirred at room temperature for 15 minutes to form a slurry. To the slurry, 62.5 g (8.0 wt %) of the polyrotaxane was added, followed by stirring at room temperature for 14 minutes. Then, 50 mL of an aqueous solution of 4 N NaOH (the total amount of the aqueous NaOH solution: 250 mL, 32.1 wt %) was added thereto, followed by stirring for 16 minutes. Then, 16 mL (2.1 wt %) of BDGE was added thereto, followed by stirring for 7 minutes. This was placed in a stainless steel tray and was left to stand at room temperature for 24 hours for gelation and then was placed in water for neutralization. This gel was crushed into irregular shapes of about 3 mm or less with a mixer, followed by washing with water to obtain a gel-like abrasive.

Example 3

A polyrotaxane solution was obtained by dissolving 62.5 g (8.0 wt %) of the polyrotaxane in 250 mL (32.1 wt %) of an aqueous solution of 1.2 N NaOH. This solution was mixed with 450 g (57.8 wt %) of an abrasive (grain size: #8000) including SiC as a main component, and the mixture was stirred at room temperature for 12 minutes. Then, 16 mL (2.1 wt %) of BDGE was added thereto, followed by stirring at room temperature for 11 minutes. The mixture was defoamed in a vacuum (gauge pressure: −0.1 MPa) for 17 minutes, then placed in a stainless steel tray, left to stand at room temperature for 19 hours for gelation under a pressure of 5 g/cm$^2$ applied with a weight placed thereon, and then placed in water for neutralization. This gel was crushed into irregular shapes of about 3 mm or less with a mixer, followed by washing with water to obtain a gel-like abrasive.

Example 4

A polyrotaxane solution was obtained by dissolving 62.5 g (6.8 wt %) of the polyrotaxane in 250 mL (27.4 wt %) of an aqueous solution of 1.2 N NaOH. This solution was mixed with 585 g (64.0 wt %) of an abrasive (grain size: #8000) including SiC as a main component, and the mixture was stirred at room temperature for 34 minutes. Then, 16 mL (1.8 wt %) of BDGE was added thereto, followed by stirring for 10 minutes. The mixture was defoamed in a vacuum (gauge pressure: −0.1 MPa) for 6 minutes, then placed in a stainless steel tray, left to stand at room temperature for 13 hours for gelation under a pressure of 30 g/cm$^2$ applied with a weight placed thereon, and then placed in water for neutralization. This gel was crushed into irregular shapes of about 3 mm or less with a mixer, followed by washing with water to obtain a gel-like abrasive.

Example 5

450 g (57.8 wt %) of an abrasive (grain size: #8000) including SiC as a main component was immersed in 250 mL (32.1 wt %) of an aqueous solution of 1.5 N NaOH at room temperature for 3 hours to allow NaOH to react, in advance, with trace Si remaining in the abrasive so that hydrogen gas generated by the reaction is not generated during gelation. This mixture of the aqueous NaOH solution and the abrasive was mixed with 62.5 g (8.0 wt %) of the polyrotaxane, and the mixture was stirred for 20 minutes for dissolving the polyrotaxane and uniformly dispersing the abrasive in the aqueous NaOH solution. Then, 16 mL (2.1 wt %) of BDGE was added thereto, and the mixture was stirred at room temperature for 12 minutes. The mixture was defoamed in a vacuum (gauge pressure: −0.1 MPa) for 9 minutes, formed into a sheet-like shape having a thickness of about 3 mm, left to stand at room temperature for 15 hours for gelation, and then placed in water for neutralization. This gel sheet was cut into 2 mm to 3 mm squares with a cutter knife to obtain a gel-like abrasive.

Example 6

180 g (56.9 wt %) of an abrasive (grain size: #8000) including SiC as a main component was immersed in 100 mL (31.6 wt %) of an aqueous solution of 1.5 N NaOH at room temperature for 24 hours to allow NaOH to react, in advance, with trace Si remaining in the abrasive so that hydrogen gas generated by the reaction is not generated during gelation. This mixture of the aqueous NaOH solution and the abrasive was mixed with 25 g (7.9 wt %) of the polyrotaxane, and the mixture was stirred for 18 minutes for dissolving the polyrotaxane and uniformly dispersing the abrasive in the aqueous NaOH solution. Then, 11.2 mL (3.5 wt %) of BDGE was added thereto, and the mixture was stirred at room temperature for 5 minutes. The mixture was placed in a stainless steel tray and left to stand at room temperature for 49 hours for gelation and then placed in water for neutralization. This gel was crushed into irregular shapes of about 3 mm or less with a mixer, followed by washing with water to obtain a gel-like abrasive.

Example 7

120.0 g (47.4 wt %) of an abrasive (grain size: #8000) including SiC as a main component was immersed in 100 mL (39.5 wt %) of an aqueous solution of 1.5 N NaOH at room temperature for 28 hours to allow NaOH to react, in advance, with trace Si remaining in the abrasive so that hydrogen gas generated by the reaction is not generated during gelation. This mixture of the aqueous NaOH solution and the abrasive was mixed with 25 g (9.9 wt %) of the polyrotaxane, and the mixture was stirred for 10 minutes for dissolving the polyrotaxane and uniformly dispersing the abrasive in the aqueous NaOH solution. Then, 8.4 mL (3.3 wt %) of BDGE was added thereto, and the mixture was stirred at room temperature for 5 minutes. The mixture was placed in a stainless steel tray and left to stand at room temperature for 24 hours for gelation and then placed in water for neutralization. This gel was crushed into irregular shapes of about 3 mm or less with a mixer, followed by washing with water to obtain a gel-like abrasive.

Example 8

180 g (43.8 wt %) of an abrasive (grain size: #8000) including SiC as a main component was immersed in 200 mL (48.7 wt %) of an aqueous solution of 1.5 N NaOH at room temperature for 6 hours to allow NaOH to react, in advance, with trace Si remaining in the abrasive so that hydrogen gas generated by the reaction is not generated during gelation. This mixture of the aqueous NaOH solution and the abrasive was mixed with 25 g (6.1 wt %) of the polyrotaxane, and the mixture was stirred for 10 minutes for dissolving the polyrotaxane and uniformly dispersing the abrasive in the aqueous NaOH solution. Then, 5.6 mL (1.4 wt %) of BDGE was added thereto, and the mixture was stirred at room temperature for 5 minutes. The mixture was placed in a stainless steel tray and left to stand at room temperature for 23 hours for gelation and then placed in water for neutralization. This gel was crushed into irregular shapes of about 3 mm or less with a mixer, followed by washing with water to obtain a gel-like abrasive.

Example 9

350 g (50 wt %) of an abrasive (grain size: #8000) including SiC as a main component was immersed in 280 mL (40.0 wt %) of an aqueous solution of 1.5 N NaOH at room temperature for 72 hours to allow NaOH to react, in advance, with trace Si remaining in the abrasive so that hydrogen gas generated by the reaction is not generated during gelation. This mixture of the aqueous NaOH solution and the abrasive was mixed with 47.2 g (6.7 wt %) of the polyrotaxane, and the mixture was stirred for 7 minutes for dissolving the polyrotaxane and uniformly dispersing the abrasive in the aqueous NaOH solution. Then, 22.8 mL (3.3 wt %) of BDGE was added thereto, and the mixture was stirred at room temperature for 10 minutes. The mixture was placed in a stainless steel tray and left to stand at room temperature for 22 hours for gelation and then placed in water for neutralization. This gel was crushed with a mixer into irregular shapes and washed with water and classified to 0.3 mm to 3 mm to obtain a gel-like abrasive.

Example 10

233.3 g (40.0 wt %) of an abrasive (grain size: #8000) including SiC as a main component was immersed in 280 mL (48.0 wt %) of an aqueous solution of 1.5 N NaOH at room temperature for 73 hours to allow NaOH to react, in advance, with trace Si remaining in the abrasive so that hydrogen gas generated by the reaction is not generated during gelation. This mixture of the aqueous NaOH solution and the abrasive was mixed with 47.2 g (8.1 wt %) of the polyrotaxane, and the mixture was stirred for 16 minutes for dissolving the polyrotaxane and uniformly dispersing the abrasive in the aqueous NaOH solution. Then, 22.8 mL (3.9 wt %) of BDGE was added thereto, and the mixture was stirred at room temperature for 10 minutes. The mixture was placed in a stainless steel tray and left to stand at room temperature for 22 hours for gelation and then placed in water for neutralization. This gel was crushed with a mixer into irregular shapes and washed with water and classified to 0.3 mm to 3 mm to obtain a gel-like abrasive.

Example 11

137.5 g (55.0 wt %) of an abrasive (grain size: #3000) including SiC as a main component was immersed in 87.5 mL (35.0 wt %) of an aqueous solution of 1.5 N NaOH at room temperature for 47 hours to allow NaOH to react, in advance, with trace Si remaining in the abrasive so that hydrogen gas generated by the reaction is not generated during gelation. This mixture of the aqueous NaOH solution and the abrasive was mixed with 20.5 g (8.2 wt %) of the polyrotaxane, and the mixture was stirred for 18 minutes for dissolving the polyrotaxane and uniformly dispersing the abrasive in the aqueous NaOH solution. Then, 4.5 mL (1.8 wt %) of BDGE was added thereto, and the mixture was stirred at room temperature for 5 minutes. The mixture was placed in a stainless steel tray and left to stand at room temperature for 26 hours for gelation and then placed in water for neutralization. This gel was crushed with a mixer into irregular shapes and washed with water and classified to 0.3 mm to 3 mm to obtain a gel-like abrasive for blasting.

Example 12

A gel-like abrasive was obtained as in Example 11 except that an abrasive including SiC as a main component of a grain size #10000 was used.

Example 13

100 g (40 wt %) of an abrasive (grain size: #3000) including SiC as a main component was immersed in 123 mL (49.2 wt %) of an aqueous solution of 1.5 N NaOH at room temperature for 141 hours to allow NaOH to react, in advance, with trace Si remaining in the abrasive so that hydrogen gas generated by the reaction is not generated during gelation. This mixture of the aqueous NaOH solution and the abrasive was mixed with 18 g (7.2 wt %) of the polyrotaxane, and the mixture was stirred for 8 minutes for dissolving the polyrotaxane and uniformly dispersing the abrasive in the aqueous NaOH solution. Then, 9 mL (3.6 wt %) of BDGE was added thereto, and the mixture was stirred at room temperature for 5 minutes. The mixture was placed in a stainless steel tray and left to stand at room temperature for 26 hours for gelation and then placed in water for neutralization. This gel was crushed with a mixer into irregular shapes and washed with water and classified into 0.3 mm to 3 mm to obtain a gel-like abrasive.

Example 14

A gel-like abrasive was obtained as in Example 13 except that an abrasive including SiC as a main component of a grain size #10000 was used.

3. Blasting Test (1) Outline of the Test

The following two test pieces were subjected to blasting using the gel-like abrasives produced by the methods of Examples 1 to 14 (Examples).

As a Comparative Example, the test pieces were subjected to blasting by projecting only abrasive grains, and the surfaces of the test pieces were observed and evaluated after the blasting.

(2) Test Pieces (2-1) Test Piece 1: SUS304 Plate with a Mirror-Finish Surface (Width×Length: 100 mm×10 mm, Thickness: 5 mm)

(2-2) Test Piece 2: SUJ2 Plate Blasted as Pre-Treatment by the Following Method (Width×Length: 100 mm×10 mm, Thickness: 5 mm)

SiC abrasive grains ("Fuji Rundum" (GC) #400, a product of Fuji Manufacturing Co., Ltd.) were ejected with a gravity-type blasting machine ("SGF-3", a product of Fuji Manufacturing Co., Ltd.) at an ejection pressure of 0.3 MPa, a nozzle diameter φ of 5 mm, an ejection angle (tilt of the nozzle with respect to the test piece surface) of 90°, and a distance between the test piece and the nozzle of 100 mm.

(3) Blasting Conditions (3-1) Example

The two types of test pieces were respectively subjected to blasting using the gel-like abrasives for blasting obtained by the methods of Examples 1 to 14.

Both test pieces were blasted using a gravity-type blasting machine (SGF-3, a product of Fuji Manufacturing Co., Ltd.) as the blasting machine under blasting conditions including an ejection pressure of 0.3 MPa, a nozzle diameter ϕ of 6 mm, an ejection angle (tilt of the nozzle with respect to the test piece surface) of 45°, and a distance between the test piece and the nozzle of 60 mm.

(3-2) Comparative Example

As a Comparative Example, the two types of test pieces were respectively subjected to blasting using only SiC abrasive grains ("Fuji Rundum" (GC) #8000, a product of Fuji Manufacturing Co., Ltd.: the same abrasive grains as those used for producing the gel-like abrasive of Example 3).

Both test pieces were blasted using a gravity-type blasting machine ("SGF-3", a product of Fuji Manufacturing Co., Ltd.) as the blasting machine under blasting conditions including an ejection pressure of 0.3 MPa, a nozzle diameter ϕ of 6 mm, an ejection angle (tilt of the nozzle with respect to the test piece surface) of 45°, and a distance between the test piece and the nozzle of 60 mm.

(4) Evaluation Method (4-1) Evaluation of Test Piece 1 (Mirror-Finish SUS304 Plate)

Surface conditions of the test piece 1 were observed using a "Digital Microscope", a product of Keyence Corp.

(4-2) Evaluation of Test Piece 2 (SUJ2 Plate Pre-Treated by Blasting)

Surface roughness (Ra and Ry) was measured using "Surfcom 130A", a surface profilometer of Tokyo Seimitsu Co., Ltd.

(4-3) Evaluation of the Used Abrasive Grains (Confirmation of Durability)

Of the gel-like abrasives (Examples 1 to 14) of the present invention used for the above blasting, the post-use condition was observed for those used for processing test piece 1.

(4-4) Confirmation of Occurrence of Static Electricity

The occurrence of static electricity was confirmed by visually observing the conditions of the abrasive grains adhering to the test piece and the inner wall of a processing chamber during the blasting by the above-mentioned method.

(5) Test Results (5-1) Evaluation results of test piece 1

On the surfaces of the test pieces blasted using the abrasive for blasting (Examples 1 to 14) of the present invention, numerous streaky cutting traces formed extending in a straight line along the direction of ejecting of the abrasive were confirmed. In addition, formation of pearskin-like irregularities was not confirmed.

This confirmed that the abrasive of the present invention can suitably prevent the formation of pearskin-like irregularities on the surface of a workpiece and also that it is possible to cut the surface of a workpiece in a substantially parallel manner by sliding of the abrasive on the surface of the workpiece.

On the other hand, in the test piece onto which the abrasive grains were directly projected, the processed surface was pearskin-like, and no formation of streaky cutting traces was confirmed. This confirmed that the formation of a pearskin surface cannot be prevented and also that the abrasive grains cannot slide along the surface of a workpiece only by tilting the projection angle of the abrasive grains with respect to the surface of the workpiece, and that the abrasive of the present invention is effective for preventing the formation of a pearskin surface and for planarization processing by sliding of the abrasive.

(5-2) Evaluation Test of Test Piece 2

Table 2 shows the results of surface roughness measurement of test piece 2 processed by the abrasive (Example 3) of the present invention and test piece 2 processed by the abrasive grains of the Comparative Example.

TABLE 2

| Measurement result of surface roughness of test piece 2 | | |
|---|---|---|
| Surface roughness | Ra (μm) | Ry (μm) |
| Example | 0.05 | 0.58 |
| Comparative Example | 0.13 | 1.51 |

It was confirmed from the above results that the surface roughness of test piece 2 processed by using the abrasive of the present invention was considerably reduced compared with test piece 2 processed by using the abrasive grains of the Comparative Example.

In addition, visual observation also confirmed that test piece 2 before the processing had a surface that was pearskin-like, scabrous, and matte due to the blasting performed as pre-treatment, but it was confirmed that a mirror-finish is obtained by the processing with the abrasive of the present invention.

Therefore, it was confirmed that, with the abrasive of the present invention, it is possible to perform mirror finishing of a surface of a workpiece by blasting.

(5-3) Evaluation (Confirmation of Durability) Results of Used Abrasive

The results of observing the conditions of the abrasive (Example 3) of the present invention after its use in the blasting test indicated that almost no damage such as rupture and cracking occurred in the abrasive.

Furthermore, at the surface of the used abrasive, a part of the dispersedly mixed abrasive grain was substantially uniformly exposed over the entire abrasive. Thus, it was also confirmed that almost no detachment of the abrasive occurred before and after its use.

Therefore, it was confirmed that the abrasive of the present invention has high durability such that wear of the abrasive by rupture, cracking, or the like is low, thereby tolerating repeated use by collecting it at a high collection rate and also that since detachment of the abrasive grains when used is small, the cutting performance of the abrasive is hardly changed, carrying out stable processing, even if repeatedly used.

(5-4) Confirmation Results of Occurrence of Static Electricity

In the blasting by directly projecting the abrasive grains in the Comparative Example, it was confirmed that a large amount of abrasive grains electrostatically adhered to the test piece and the inner wall of the processing chamber. On the other hand, in the blasting using the abrasive of the present invention (Examples 1 to 14), almost no adhesion of the abrasive to the test piece and the inner wall of the processing chamber was confirmed in blasting of either test piece. Thus, it was confirmed that the property of swelling of the gel-like abrasive of the present invention by impregnation with a liquid (water) is effective for preventing the occurrence of static electricity.

(5-5) Others

It was possible to readily remove dust such as cutting powder adhering to the surface by putting the abrasive of the present invention collected after blasting in a basket-like container and washing the abrasive with water by immersing it together with the container in a water tank.

Furthermore, after washing, the water tank was left to stand, and then from the precipitate on the bottom, it was confirmed that hardly any abrasive grains were contained in the precipitate. In addition, the observation of the surface of the abrasive after the washing confirmed that no adhesion of dust and no distinct detachment of the abrasive grains occurred. Thus, it was confirmed that the abrasive of the present invention can be restored to a state exhibiting the initial property in, for example, cutting characteristics by removing dust by, for example, washing it with water.

In addition, it was confirmed that since the used abrasive can swell again by absorbing water by being immersed in water, ejected with moisture, or supplied with water, and also that the abrasive has high durability, the abrasive can be suitably used repeatedly.

What is claimed is:

1. A gel-like abrasive comprising:
   a crosslinked polyrotaxane formed by chemical bonding between circular molecules of polyrotaxane and having a network structure where crosslinking points are the circular molecules; and
   abrasive grains dispersedly mixed in the crosslinked polyrotaxane so that a part of the abrasive grain is exposed at the surface of the gel-like abrasive.

2. The gel-like abrasive according to claim 1, wherein the ratio of the abrasive grains to the crosslinked polyrotaxane is 0.05 to 10.0.

3. The gel-like abrasive according to claim 1, wherein the polyrotaxane includes α-cyclodextrin as the circular molecule and polyethylene glycol as the straight-chain molecule.

4. The gel-like abrasive according to claim 2, wherein the polyrotaxane includes α-cyclodextrin as the circular molecule and polyethylene glycol as the straight-chain molecule.

5. A method for producing a gel-like abrasive comprising:
   obtaining a crosslinked polyrotaxane compound having a network structure where crosslinking points are circular molecules of polyrotaxane and also having abrasive grains dispersedly mixed therein by causing chemical bonding between the circular molecules of the polyrotaxane in a state where the abrasive grains and the polyrotaxane are mixed; and
   subsequently granulating the crosslinked polyrotaxane compound to a predetermined grain diameter.

6. The method for producing a gel-like abrasive according to claim 5, wherein the state where the abrasive grains and the polyrotaxane are mixed is generated by dispersing the abrasive grains in a polyrotaxane solution.

7. The method for producing a gel-like abrasive according to claim 6, wherein the polyrotaxane having α-cyclodextrin as the circular molecule and polyethylene glycol as the straight-chain molecule is used.

8. The method for producing a gel-like abrasive according to claim 5, wherein the chemical bond between the circular molecules is a covalent bond.

9. The method for producing a gel-like abrasive according to claim 7, wherein the chemical bond between the circular molecules is a covalent bond.

10. The method for producing a gel-like abrasive according to claim 5, wherein the circular molecules are chemically bonded by addition of a crosslinking agent.

11. The method for producing a gel-like abrasive according to claim 8, wherein the circular molecules are chemically bonded by addition of a crosslinking agent.

12. The method for producing a gel-like abrasive according to claim 9, wherein the circular molecules are chemically bonded by addition of a crosslinking agent.

13. The method for producing a gel-like abrasive according to claim 10, wherein the circular molecule is α-cyclodextrin, and the crosslinking agent is 1,4-butanediol diglycidyl ether.

14. The method for producing a gel-like abrasive according to claim 11, wherein the circular molecule is α-cyclodextrin, and the crosslinking agent is 1,4-butanediol diglycidyl ether.

15. The method for producing a gel-like abrasive according to claim 12, wherein the circular molecule is α-cyclodextrin, and the crosslinking agent is 1,4-butanediol diglycidyl ether.

* * * * *